Sept. 14, 1954 W. E. BRADLEY 2,689,269

ELECTRICAL SYSTEM

Filed Jan. 26, 1951

INVENTOR.
WILLIAM E. BRADLEY
BY
Allan V. Hazeltine
ATTORNEY

Patented Sept. 14, 1954

2,689,269

UNITED STATES PATENT OFFICE 2,689,269

ELECTRICAL SYSTEM

William E. Bradley, New Hope, Pa., assignor to Philco Corporation, Philadelphia, Pa., a corporation of Pennsylvania Application January 26, 1951, Serial No. 208,060

13 Claims. (Cl. 178—5.4)

Figures 1, 2, 3:
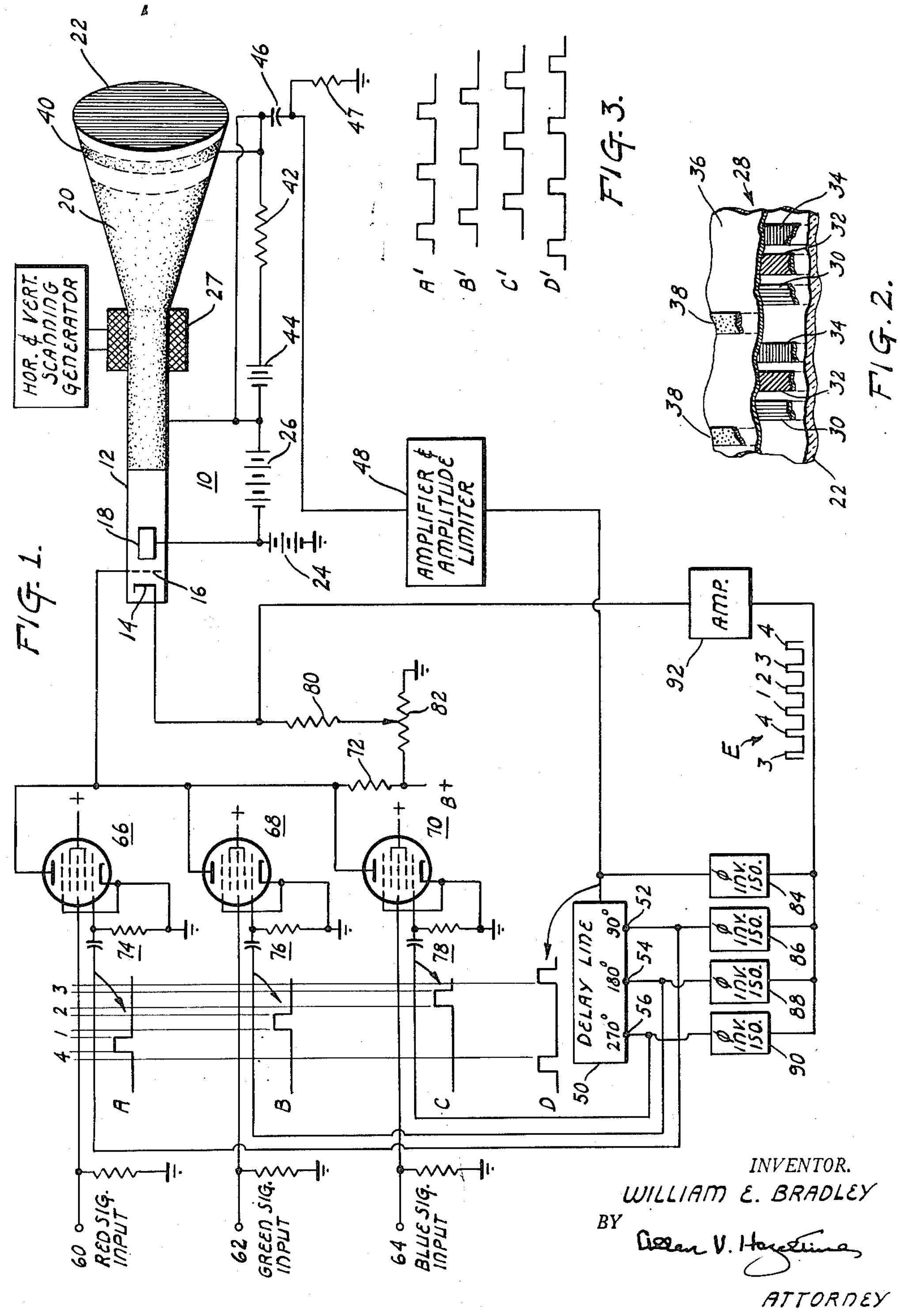

The present invention relates to electrical systems and more particularly to cathode-ray tube systems in which the position of the electron beam relative to a beam intercepting member of the tube is controlled by an indexing member so arranged in cooperative relationship with the beam intercepting member to produce a signal whose time of occurrence is indicative of the time at which the cathode-ray beam attains a predetermined position.

The invention is particularly adapted for and will be described in connection with a color television image presentation system utilizing a single cathode-ray tube having a beam intercepting, image forming screen member comprising vertical stripes of luminescent materials. These strips are preferably arranged in laterally-displaced color triplets, each triplet comprising three vertical phosphor stripes which respond to electron impingement to produce light of the different primary colors. The order of arrangement of the stripes may be such that the normal horizontally-scanning cathode-ray beam produces red, green and blue light successively. From a color television receiver there are then supplied three separate video signals, each indicative of a different primary color component of a televised scene, which signals are sampled sequentially and utilized to control the intensity of the cathode-ray beam. For proper color rendition, it is then required that, as the phosphor stripes producing each of the primary colors of light are impinged by the cathode-ray beam, the intensity of the beam be simultaneously controlled in response to the contemporaneous value of the video signal representing the corresponding color component of the televised image. However, since the rate at which the beam scans across the phosphor stripes of the screen may be variable, due, for example, to non-linearity of the beam deflecting signal, the times at which the samples of the several video color signals should be taken will generally not occur exactly periodically. To obtain proper timing of the sampling operations, it is therefore desirable to derive signals indicative of the instantaneous position of the cathode-ray beam upon the image-forming screen, and to utilize these indexing signals to control the times at which samplings of the several color signals are effected. The said indexing signals may be derived from a plurality of stripe members arranged on the beam intercepting screen structure each adjacent a triplet so that, when the beam scans the screen, the indexing stripes are excited in spaced time sequence to the scanning of the color triplets and a series of pulses is generated in a suitable output electrode system of the cathode-ray tube.

The indexing stripes may comprise a material having secondary-emissive properties which differ from the secondary-emissive properties of the remaining portions of the beam intercepting structure. For example, the indexing stripes may consist of a high atomic number material such as gold, platinum or tungsten or may consist of certain mixtures including cesium or cesium oxide, and the remainder of the beam intercepting structure may be provided with a coating of a material having a detachably different secondary-emissive ratio such as a coating of aluminum, which coating also serves as a light reflecting mirror for the phosphor stripes in accordance with well known practice. With such an arrangement the indexing signals may be derived from a collector electrode arranged in the vicinity of the screen structure. Alternately, the indexing stripes may consist of a fluorescent material such as zinc oxide having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

In practice there exists the danger that the normally detectable voltage indicating the impingement of the beam onto the indexing stripes may be masked or at least contaminated by spurious voltages. More particularly, it is found that, at the high accelerating voltages of the order of 10 to 20 kilovolts used in the cathode-ray tubes for the systems under consideration, only a relatively small difference in the secondary-emissive ratio of the materials of the indexing stripes and of the remainder of the screen structure can be realized and that in the heretofore proposed systems the presence of video signals and noise voltages in the collector electrode system may significantly diminish the effective value of the indexing signal. Similarly, in those instances in which the indexing signal is produced by means of a photo-electric detector and an indexing stripe comprising a fluorescent material which produces light in the non-visible region of the spectrum, the detector may be also actuated by soft X-rays which are produced by the high voltage beam or by extraneous light from sources external to the cathode-ray tube or from the phosphor stripes of the color triplets, the latter light in some instances penetrating the aluminum mirror coating superimposed on the color stripes.

It is an object of the invention to provide an improved cathode-ray tube system of the type in which the position of the electron beam relative to a beam intercepting member is controlled by an indexing member.

Another object of the invention is to provide a cathode-ray tube system of the type in which the position of the electron beam is controlled by an indexing member and in which a clearly defined indexing signal voltage is generated.

A further object of the invention is to provide a cathode-ray tube system in which the intensity of the indexing signal voltage is made substantially independent of the video information applied to the system.

A specific object of the invention is to provide a cathode-ray tube system in which normally contaminating influences have substantially no significant effect on the indexing signal produced by the cathode-ray tube.

These and further objects of the invention will appear as the specification progresses.

In accordance with the invention, the foregoing objects are achieved by employing a cathode-ray tube having disposed therein a beam intercepting structure comprising beam position indicating elements arranged in predetermined geometric relationship to other portions of the beam intercepting structure. These beam position indicating elements, as above pointed out, may be characterized by values of secondary-emissive ratio or by spectral emission characteristics which differ from those characterizing other regions of the beam interceptive structure when electrons of the cathode-ray beam impinge thereon. In order to produce a clearly defined indexing signal readily distinguishable from contaminating influences, there is provided, as an integral part of the cathode-ray tube system, means whereby the intensity of the electron beam is momentarily and automatically increased to a given predetermined value during the intervals when the beam impinges on the indexing stripes. Preferably, the intensity of the beam is momentarily increased to a value greater than the maximum beam intensity produced by the video signals applied to the cathode-ray tube. In the case of cathode-ray tube systems in which the magnitude of the indexing signal is determined by the secondary emission ratio of the material of the indexing stripe, it has been found that, by so modifying the beam intensity at the instant the beam impinges on the indexing stripes, the intensity of the indexing signal markedly differs from the intensity of spurious voltages generated by the portions of the beam interceptive member when the beam impinges at its normal intensity on such other portions. Similarly, in the case of cathode-ray tube systems in which the indexing voltage is derived from the non-visible light generated when the beam impinges on a fluorescent indexing stripe, the output signal produced is greater, by orders of magnitude, than any spurious voltage produced by contaminating influences internal or external to the cathode-ray tube.

The invention will be described in greater detail with reference to the appended drawings forming part of the specification and in which:

Figure 1 is a diagram partly schematic showing a cathode-ray tube system in accordance with the invention and embodying certain modifications later to be described in detail, Figure 2 is an enlarged plan view partly cut away of a portion of a beam-intercepting indexing screen member which may be used in the cathode-ray tube of the system shown in Figure 1 and, Figure 3 is a graph showing the relative size and phases of certain voltage impulses for controlling the cathode-ray tube system of the invention in accordance with one embodiment thereof.

Referring to Figure 1 the cathode-ray tube system shown therein comprises a cathode-ray tube 10 containing, within an evacuated envelope 12, a conventional beam generating and accelerating electrode system comprising a cathode 14, a control electrode 16 for varying the intensity of the beam, a first anode or focusing electrode 18, and a beam accelerating electrode 20 which may consist of a conductive coating on the inner wall of the envelope and which terminates at a point spaced from the end face 22 of the tube in conformance with well-established practice. Suitable heating means (not shown) are provided for maintaining the cathode 14 at its operating temperature. The electrode system so defined is energized by a suitable source of potential shown as a battery 24 having its negative pole connected to ground and its positive pole connected to the anode 18 and by a battery 26 having its negative pole connected to the positive pole of the battery 24 and its positive pole connected to the accelerating electrode 20. In practice the battery 24 has a potential of 1 to 3 kilovolts whereas the battery 26 has a potential of the order of 10 to 20 kilovolts.

A deflection yoke 27 coupled to horizontal and vertical deflection circuits of conventional design is provided for deflecting the generated electron beam across the face plate 22 of the cathode-ray tube to form a raster thereon.

The end face plate 22 of the tube is provided with a beam intercepting structure 28 shown in detail in Figure 2. In the arrangement shown in Figure 2 the structure 28 is formed directly on the face plate 22, however, it should be well understood that the structure 28 may be formed on a suitable light transparent base which is independent of the face plate 22 and may be spaced therefrom. In the arrangement shown, the end face 22 which in practice consists of glass having preferably substantially uniform transmission characteristics for the various colors in the visible spectrum, is provided with a plurality of spaced groups of elongated parallel arranged stripes 30, 32 and 34, of phosphor material which, upon impingement of the cathode beam, fluoresce to produce light of three different primary colors. For example, the stripe 30 may consist of a phosphor which upon excitation produces red light, the stripe 32 may consist of a phosphor which produces green light and the stripe 34 may consist of a phosphor which produces blue light. Each of the groups of stripes may be termed a color triplet and, as will be noted, the sequence of the stripes is repeated in consecutive order over the area of the structure 28. Suitable materials constituting the phosphor stripes 30, 32 and 34 are well known to those skilled in the art as well as the method of applying the same to the face plate 22, and further details concerning the same are believed to be unnecessary.

In the arrangement shown, the indexing signal is produced by utilizing indexing stripes of a given secondary-emissive ratio differing from the secondary-emissive ratio of the remainder of the beam intercepting structure and for this purpose the structure 28 further comprises a thin electron permeable conducting layer 36 of low secondary emissivity. The layer 36 is arranged on the phosphor stripes 30, 32 and 34 and preferably further constitutes a mirror for reflecting light generated at the phosphor stripes. In practice the layer 36 is a light reflecting aluminum coating which is formed in well known manner. It should be well understood that other metals capable of forming a coating in the manner similar to aluminum, and having a secondary-emissive ratio detectably distinct from that of the material of the indexing member, may also be used. Such other metals may be, for example, magnesium or beryllium.

Arranged on the coating 36 and spaced between adjacent groups of color stripes are indexing stripes 38 consisting of a material having a secondary-emissive ratio detectably different from that of the material of coating 36. The stripes 38, usually of gold, may consist of other high atomic number metals such as platinum or tungsten or of a mixture containing cesium oxide as previously pointed out.

The beam intercepting structure so constituted is connected to the positive pole of the battery 26 by means of a suitable lead attached to the aluminum coating 36.

Interposed between the end of the accelerating anode 20 and the beam intercepting structure 28 is an output collector electrode 40 consisting of a ring shaped coating for example, of graphite or of silver, on the wall of the envelope. Electrode 40 is energized through a load resistor 42 by a suitable source 44, shown as a battery. The source 44 may have a potential of the order of 3 kilovolts.

The cathode-ray beam in its vertical and horizontal travel across the beam intercepting structure 28 (see Figure 2) impinges successively on the coating 36 and the indexing stripes 38 producing through the load resistor 42 a secondary-emissive current having components which tend to mask or contaminate the index signal voltage to a greater or lesser extent. In order to provide an indexing signal which is clearly distinguished from any contaminating influences and in accordance with the invention, the intensity of the electron beam is momentarily made to assume a predetermined value during the intervals in which the beam impinges on the indexing stripes. More particularly, and as later to be more fully pointed out, in the preferred arrangement of the invention the electron beam is made to momentarily assume an intensity greater than the maximum value produced by the video signals applied to the cathode-ray tube. By so modifying the intensity of the electron beam during its impingement on the indexing stripes and thereby correspondingly increasing the secondary-emissive current at the collector electrode 40 during these intervals, the indexing current component thereof is increased without correspondingly increasing the spurious current components so that an output voltage is produced across the load impedance 42 consisting predominantly of an indexing component and having spurious or masking components present only to a minor extent.

The indexing signals so produced are used for controlling the instances at which the video color signals are applied to the cathode-ray tube during the movement of the beam across the beam intercepting structure 28 and further provide the control by which the intensity of the cathode-ray beam is automatically modified to the desired value during its impingement on the indexing stripes. More specifically, the indexing voltage appearing across the load resistor 42 is applied by means of a resistance-capacitance network 46 and 47 to the input of an amplifier 48 containing an amplitude limiter of conventional design by means of which any spurious modulation appearing on the indexing signals is removed. Amplifier 48 is characterized by sufficient gain to amplify the indexing signals supplied thereto to a conveniently usable level, and may be adapted to do so without distortion of the indexing pulse wave-form, although this is not essential so long as the phase characteristics of the amplifier are such that the positive peaks of the amplified output signals therefrom occur in predetermined time relationship to the times of occurrence of peaks produced in the signal at the load resistor 42 in response to impingement of the cathode-ray beam on the indexing stripes.

The output signals from amplifier 48 are supplied to the input of a delay line 50, which is provided with three taps 52, 54 and 56. Delay line 50 may comprise a series of filter sections designed in accordance with principles well known in the art so as to provide a total delay for signals passing therethrough which is at least as great as the average time required for the cathode-ray beam to scan from the center of one indexing stripe 38 to the center of the next subsequently-impinged indexing stripe 38, and is preferably terminated in its characteristic impedance so as to minimize reflections from the termination thereof.

Tap 52 is spaced from the input of delay line 50 by an amount sufficient to provide a signal delay therebetween substantialy equal to the average time required for the cathode-ray beam to sweep from the center of an indexing stripe to the center of the adjacent red phosphor stripe 30, tap 54 is spaced from tap 52 by an amount sufficient to provide a value of signal delay therebetween substantially equal to the average time required for the cathode-ray beam to travel from the center of a red phosphor stripe to the center of the next adjacent green phosphor stripe 32, while tap 56 is spaced from tap 54 by an amount sufficient to provide a signal delay substantially equal to the average time required for the cathode-ray beam to sweep from the center of a green phosphor stripe to the center of the next adjacent blue phosphor stripe 34. In practice, and assuming a uniform placing of the color and indexing stripes 30, 32, 34 and 38, the taps at the delay line provide signals having displacements of 90°, 180° and 270° relative to the phase position of the index signal applied to the input of the delay line.

For the reproduction of a color image on the face plate of the cathode-ray tube, there are provided color signal input terminals 60, 62 and 64 which are supplied from a television receiver with separate signals indicative of the red, green and blue components of the televised scene, respectively, which signals preferably have had their D.-C. components restored, and are of such polarity that the more positive portions thereof correspond to darker regions of the television image. The system then operates to sample these three color signals in sequence so that the red video signal controls the cathode-ray beam intensity upon impingement of the red stripe 30 of the beam intercepting structure 28, the green video signal is controlling upon impingement of the green stripe 32 and the blue video signal controls the beam intensity when the blue stripe 34 is impinged. Accordingly, the three video input signals are supplied to intensity-controlling electrode 16 through sampling tubes 66, 68 and 70 respectively. Sampling tube 66 may comprise a pentagrid vacuum tube which has its suppressor and cathode grounded, its second and fourth grids connected to a suitable source of positive screen potential, its third grid supplied with the red video signal to be sampled, its first grid supplied with a sampling signal for rendering tube 66 conductive only during predetermined portions of the sampling signal, and its plate connected to a source of positive potential designated B+ through a plate load resistor 72 and to the control grid 16.

Sampling tubes 68 and 70 may be substantially identical with sampling tube 66, being supplied at their respective third grids with the green and blue video signals, respectively, and having their respective plates connected to the source of potential B+ through the common plate load resistor 72. By supplying each of the color-signal sampling tubes, at the first grids thereof, with sampling signals whose positive peak values coincide in time with impingement of the corresponding color stripes arranged on the beam intercepting structure 15, the color samples are applied to intensity-controlling electrode 16 at the proper times.

The signal at tap 52 constitutes a red-signal sampling signal which is supplied through a resistance-capacitance circuit 74 to the first grid of red signal sampler tube 66 so as to actuate the same and thereby apply a sample of the red video input signal to the intensity-controlling electrode 16 of cathode-ray tube 10. The time constant of resistance-capacitance network 74 is sufficiently long, compared to the period of the sampling signal from tap 52, so that leveling upon the peaks of the sampling signals supplied thereto from tap 52 is effected, and actuation of sampling tube 66 is caused to occur only during predetermined relatively brief intervals surrounding the times at which the sampling signal attains its peak values. Similarly, the signal at delay line tap 54 is supplied through resistance-capacitance network 76 to the first grid of sampler tube 68 so as to effect sampling of the green video signal when the sampling signal at tap 54 attains its maximum values. Finally, the signal at tap 56 is supplied through resistance-capacitance network 78 to the first control grid of blue sampler tube 70, so as to effect actuation thereof contemporaneously with the attainment of peak values by the sampling signal at tap 56.

As above noted and by reason of the resistance-capacitance networks 74, 76 and 78 each of the sampling tubes 66, 68 and 70 is held non-conductive except for the periods during which a sampling pulse is applied thereto from the delay line 50. Since the sampling pulses appear at 90°, 180° and 270° intervals only, there will be periods corresponding to the 0° phase intervals when none of the sampling tubes are conductive. During these non-conductive periods of the sampling tubes a minimum voltage drop occurs across the load impedance 72 so that the grid 16 correspondingly achieves its maximum positive potential. The amount by which the potential of the control electrode 16 exceeds the potential of cathode 14, and thus the intensity of the cathode-ray beam during the non-conduction intervals of the sampling tubes, may be adjusted by varying the potential of the cathode 14, for example, by connecting the cathode through a resistor 80 to the movable tapping of a potentiometer 82 connected to a suitable source of positive potential as shown.

The periods of 0° phase intervals, when none of the sampling tubes are conductive, occur in synchronism with the periods of the indexing signals applied to the delay line 50 and therefore occur in synchronism with the intervals during which the cathode-ray beam impinges on the indexing stripes 38. As a result of the foregoing, the cathode-ray beam will assume a maximum intensity value during those intervals when the cathode-ray beam impinges on the indexing stripes and an indexing signal of correspondingly high amplitude value will be produced.

It is apparent from the foregoing, that if the indexing stripes are constituted by a fluorescent material which emits light in the invisible portion of the spectrum, i. e. of zinc oxide emitting in the ultra-violet region, and a photo-sensitive collector detector is utilized instead of the secondary emissive collector 40, the same modus operandi obtains and indexing signals having indexing components which are magnified relative to any spurious components are produced.

In practice the length of the pulses constituting the sampling signals is less than one-fourth of the period between successive pulses of the indexing signal such as shown in Figure 1 by the wave forms as A, B, C and D for the red, green and blue sampling tubes and the indexing signal respectively. This may bring about a condition wherein all of the sampling tubes are rendered non-conductive for short periods between the intervals at which the successive red, green and blue video signals are sampled corresponding to the intervals 1, 2, 3 and 4 shown in Figure 1. By reason of this action, the cathode-ray beam increases to its maximum intensity value during these non-conducting intervals and may correspondingly excite the leading and/or lagging edge of the color stripes to an intensity not indicated by the video information.

In accordance with one embodiment of the invention this difficulty is overcome by suitably extending the length of the sampling pulses so that each pulse has a length at least equal to one-fourth of the period between the pulses of the indexing signal as shown in Figure 3 by the wave forms A′, B′, C′ and D′ respectively whereby at least one sampling tube is conductive during the scanning of the color triplets by the cathode-ray beam. This may be accomplished by appropriately adjusting the constants of the resistance-capacitance network 46 and 47 and of the amplifier-limiter 48 so that indexing pulses having a length of one-quarter of the interval between pulses are produced at the output of the amplifier-limiter 48. The amplifier-limiter 48 may include suitable feed back networks to ensure against a progressive increase in the length of the output pulses from the amplifier-limiter 48.

Alternately, the stripes 30, 32 and 34 as well as the stripes 38 may be spaced apart by a distance corresponding to the intervals 1, 2, 3 and 4 as shown in Figure 2 whereby, at the instants that the beam reaches the above indicated maximum intensity value, it is positioned between the stripes and no undesirable visible light is produced by the cathode-ray tube.

In a further arrangement, the above noted difficulty is avoided by extinguishing the cathode-ray beam during periods corresponding to the periods 1, 2, 3 and 4. More particularly, and in the arrangement shown in Figure 1 there is coupled to the outlet of amplifier-limiter 48, and to the tapping points 52, 54 and 56 of the delay line 50, suitable isolation phase-inverter stages 84, 86, 88 and 90 respectively, having their outputs connected in parallel whereby an output voltage is produced constituted by pulses extending in a positive direction during the intervals 1, 2, 3 and 4 as shown by the wave form indicated by the reference E. The voltage so produced is applied through a suitable amplifier 92 to the cathode 14 of the tube 10 and since there is thus applied a high positive potential to the cathode during the intervals in question the cathode-ray beam is extinguished during such intervals.

While I have described my invention by means of specific examples and in specific embodiments I do not wish to be limited thereto for obvious modifications will occur to those skilled in the art without departing from the spirit and scope of the invention.

What I claim is:

1. A cathode-ray tube system comprising a cathode-ray tube having a source of an electron beam, means to vary the intensity of said beam and a beam intercepting structure, said beam intercepting structure having first portions thereof spaced apart and comprising a plurality of elements adapted to produce light upon impingement by said beam, said beam intercepting structure having second portions arranged between said first portions spacially displaced from all of the said light producing elements, said second portions being adapted to produce an output signal when said beam impinges thereon, means to periodically deflect said beam across said beam intercepting structure to thereby impinge said beam on said first and second portions, input means adapted to provide a signal quantity having amplitude variations within given values indicative of desired variations of the intensity of the light produced by said light producing elements, means for applying said signal quantity to said control electrode when said beam impinges said light producing elements to thereby vary the intensity of said beam within given intensity values when said beam impinges said light producing elements, and means responsive to said output signal to vary the intensity of said beam to a second given value independently of the amplitude of said signal quantity when said beam impinges on said second portions.

2. A cathode-ray tube system as claimed in claim 1 wherein said means responsive to said output voltage increases the intensity of said beam to a value greater than said given intensity values independently of the amplitude of said signal quantity when said beam impinges said second portions.

3. A cathode-ray tube system for producing a color television image, comprising a cathode-ray tube having a source of an electron beam, means to vary the intensity of said beam and a beam intercepting structure, said beam intercepting structure having first portions thereof spaced apart, each of said first portions comprising a plurality of consecutively arranged stripes of fluorescent material each adapted to produce light of a different color upon impingement by said beam, said beam intercepting structure having second portions arranged between said first portions spacially displaced from all of said light producing stripes, said second portions being adapted to produce an output signal when said beam impinges thereon, means to periodically deflect said beam across said beam intercepting structure to thereby impinge said beam on said first and second portions, input means for a plurality of video waves each having amplitude variations indicative of a given color component of said image, means for applying said video waves in the form of consecutive pulses to said control electrode when said beam impinges said light producing stripes to thereby vary the intensity of said beam within given intensity values when said beam impinges said light producing stripes, and means responsive to said output signal to increase the intensity of said beam to a predetermined value greater than said given intensity values independently of the amplitudes of said video waves when said beam impinges said second portions.

4. A cathode-ray tube system as claimed in claim 3 wherein the said consecutive stripes of fluorescent material are spaced apart a given distance and the consecutive pulses of the video signal applied to the control electrode are spaced apart by a time interval corresponding to said given distance.

5. A cathode-ray tube system as claimed in claim 3 wherein the said consecutive pulses of the video signal applied to the control electrode constitute spaced groups of contiguous pulses.

6. A cathode-ray tube system as claimed in claim 3 wherein the said means responsive to said output signal comprises a sampling system coupled to said control electrode and to said input means, means coupled to said second portions of said beam intercepting structure to produce spaced groups of sampling pulses to actuate said sampling system in synchronism with the impingement of said beam on said light producing elements, and means coupled to said sampling system and to said control electrode to increase the intensity of said beam to said given predetermined value during the intervals between said spaced groups of sampling pulses.

7. A cathode-ray tube system for producing a color television image, comprising a cathode-ray tube having a cathode source of an electron beam, a control electrode for varying the intensity of the beam, a beam intercepting structure having first portions thereof spaced apart, each of said portions comprising a plurality of stripes of fluorescent material each producing light of a different color when said electron beam impinges thereon, and said beam intercepting structure having intermediate said first portions and spacially displaced from all of said light producing stripes second portions comprising a material having a given response characteristic when said electron beam impinges thereon and means to produce an output signal indicative of the response characteristic of said second portions, means to periodically deflect said beam across said beam intercepting structure to thereby impinge said beam successively on said first and second portions, a video signal sampling system comprising a plurality of normally closed transmission paths having individual input circuits and a common output circuit, means to apply to each of said input circuits individual video voltages each indicative of a given color component of said image, means to couple said control electrode to said common output circuit at a portion thereof producing in said tube an electron beam of given intensity when said paths are simultaneously closed, means to derive from said output signal a plurality of sampling pulses consecutively arranged in spaced groups and having a time interval distribution corresponding to the space interval distribution of said light producing stripes, and means to apply said sampling pulses to said transmission paths to open said paths in consecutive order for given time intervals and thereby apply to said control electrode said individual video voltages in sequence and in synchronism with the impingement of said beam on said stripes of fluorescent material and to maintain said paths simultaneously closed for a second given time interval in synchronism with the impingement of said beam on said second portions to thereby vary the intensity of said beam to said given value independently of the amplitude of said video voltages when said beam impinges said second portions.

8. A cathode-ray tube system as claimed in claim 7 wherein said stripes of fluorescent material are spaced apart by given distances, and the sampling pulses of each of said spaced groups are spaced apart by time intervals corresponding to said given distances.

9. A cathode-ray tube system as claimed in claim 7 wherein the sampling pulses of each of said spaced groups occur during contiguous time intervals.

10. A cathode-ray tube system as claimed in claim 7 wherein the sampling pulses of each of said spaced groups are spaced apart by a given time interval and further comprising means responsive to said output signal coupled to said cathode-ray tube to extinguish said beam during the said time interval between sampling pulses of each of said spaced groups.

11. A cathode-ray tube system for producing a color television image, comprising a cathode-ray tube having a cathode source of an electron beam, a control electrode for varying the intensity of the beam, a beam intercepting structure having first portions thereof spaced apart, each of said portions comprising a plurality of stripes of fluorescent material each producing light of a different color when said electron beam impinges thereon, and said beam intercepting structure having intermediate said first portions and spacially displaced from all of said light producing stripes second portions comprising a material having a given response characteristic when said electron beam impinges thereon and means to produce an output signal indicative of the response characteristic of said second portions, means to periodically deflect said beam across said beam intercepting structure to thereby impinge said beam successively on said first and second portions, a video signal sampling system comprising a plurality of discharge tubes having input and output circuits, means coupled to said input circuits to maintain said discharge tubes normally non-conductive, means to apply to each of said input circuits individual video voltages each indicative of a given color component of said image, an impedance element connected in common with said output circuits, means to couple said impedance element to said control electrode and to a source of positive potential to thereby produce in said cathode-ray tube an electron beam of given intensity when said discharged tubes are rendered simultaneously non-conductive, means to derive from said output signal a plurality of sampling pulses consecutively arranged in spaced groups, and means to apply said pulses to said input circuits to thereby render said discharge tubes conductive in consecutive order for a given time interval in synchronism with the impingement of said beam on said stripes of fluorescent material and to maintain said discharge tubes simultaneously non-conductive for a second given time interval in synchronism with the impingement of said beam on said second portions to thereby vary the intensity of said beam to said given value independently of the amplitude of said video voltages when said beam impinges said second portions.

12. A cathode-ray tube system as claimed in claim 11 wherein the sampling pulses of each of said spaced groups are spaced apart by a given time interval and further comprising a transmission path having an input circuit and an output circuit, means to apply said sampling pulses to said input circuit, and means coupled to said output circuit to combine said sampling pulses and apply the same to the cathode of said cathode-ray tube in a sense extinguishing the said beam during the said time interval between sampling pulses of each of said spaced groups.

13. A cathode-ray tube system comprising a cathode-ray tube having an electron responsive member, means for generating electrons and for directing the same in beam formation towards said member and means for varying the flow of said electrons from said generating means, said electron responsive member having first portions thereof spaced apart and comprising a plurality of elements adapted to produce light upon electron impingement, said beam intercepting member having second portions arranged between said first portions spacially displaced from all of the said light producing elements, said second portions being adapted to produce an output signal upon electron impingement, means for scanning said electrons in beam formation across said beam intercepting member, means for providing a signal quantity having amplitude variations within given values indicative of desired variations of the intensity of the light produced by said light producing elements, means for applying said signal wave to said electron flow varying means thereby to vary the intensity of electron flow from said generating means within given intensity values during the scanning of said light producing elements, and means coupled to said electron flow varying means and responsive to said output signal for varying the intensity of electron flow from said generating means to a given value independently of the amplitude of said signal quantity during the scanning of said second portions.

References Cited in the file of this patent

UNITED STATES PATENTS

| Number | Name | Date |
|---|---|---|
| 2,343,825 | Wilson | Mar. 7, 1944 |
| 2,463,535 | Hecht | Mar. 8, 1949 |
| 2,490,812 | Huffman | Dec. 13, 1949 |
| 2,530,431 | Huffman | Nov. 21, 1950 |
| 2,545,325 | Weimer | Mar. 13, 1951 |